United States Patent [19]

Ozaki

[11] Patent Number: 4,867,408
[45] Date of Patent: Sep. 19, 1989

[54] DEVICE FOR HOLDING A MIRROR ELEMENT FOR REARVIEW MIRROR

[75] Inventor: Tadahiko Ozaki, Shizuoka, Japan
[73] Assignee: Murakami Kaimeido Co., Ltd., Shizuoka, Japan
[21] Appl. No.: 269,955
[22] Filed: Nov. 10, 1988
[30] Foreign Application Priority Data
    Apr. 11, 1988 [JP] Japan ............. 63-47799[U]
[51] Int. Cl.⁴ ............................. B60R 1/06
[52] U.S. Cl. ................................. 248/483
[58] Field of Search .......... 248/475.1, 476, 479, 248/480, 481, 482, 483, 484, 485, 486, 487; 350/633, 634, 636, 637

[56] References Cited

U.S. PATENT DOCUMENTS

| | | | |
|---|---|---|---|
| 4,197,762 | 4/1980 | Yamana | 248/479 |
| 4,502,759 | 3/1985 | Herzog | 248/487 |
| 4,555,166 | 11/1985 | Enomoto | 248/479 |
| 4,572,626 | 2/1986 | Suzuki | 248/487 |
| 4,640,142 | 2/1987 | Cummins | 248/479 |
| 4,645,164 | 2/1987 | Manzoni | |
| 4,701,037 | 10/1987 | Bramer | 248/481 |
| 4,776,231 | 10/1988 | Cummins | 248/476 |

FOREIGN PATENT DOCUMENTS

179353 9/1985 Japan ........................ 350/637

Primary Examiner—J. Franklin Foss
Assistant Examiner—Robert A. Olson
Attorney, Agent, or Firm—Michael J. Striker

[57] ABSTRACT

A device for holding a removable mirror plate of a rearview mirror for a motor vehicle and comprising a mirror holder for supporting the mirror plate, a holder plate for supporting the mirror holder, an assembly for tiltably supporting the holder plate and including a pivot provided on a surface of said holder plate and having upper and lower portions, a latch assembly located between the mirror holder and the holder plate at the upper portion of the pivot for latching the mirror holder to the holder plate, and a fixing assembly for fixing the mirror holder to the holder plate.

11 Claims, 6 Drawing Sheets

DEVICE FOR HOLDING A MIRROR ELEMENT FOR REARVIEW MIRROR

FIELD OF THE INVENTION

This invention relates to a rearview mirror for a motor vehicle. Particularly, the invention relates to a two pieces mirror holder of a mirror plate for a rearview mirror for a motor vehicle.

BACKGROUND OF THE INVENTION

A frontview mirror for a motor vehicle has a mirror housing with respect to a driving direction of the vehicle, a mirror element disposed at the front surface of the housing and a supporting means provided at the front side of the mirror element for adjusting the tilting angle of the mirror element. The mirror element comprises a mirror plate (glass mirror plate) and a mirror holder for fixing the mirror plate thereto by bonding means or the like.

The mirror holders are structurally classified into two types roughly; one is a one piece type mirror holder integrally provided with a spherical pivot projecting from a front surface of a central portion of the front surface and the other is a composite type mirror holder in which a detachable holder plate separated from a mirror body of the mirror holder is preliminary molded and is engaged into an aperture provided at the central portion of body of the mirror holder, thereby both are assembled into a unit.

The composite type mirror holder has recently become popular for reason of better solving the problem of assembling a structure for adjusting a tilting angle of the mirror which problem a one type mirror holder cannot adequately solve. A composite type mirror holder is disclosed in U.S. Pat. No. 4,645,164. The mirror holder has a mirror body mounted with a mirror plate on a rear surface thereof, a holder plate engaging an aperture provided in the mirror holder, and a bolt shaped supporting means prepared as another component. The holder plate has several external lugs protruded outwardly and a periphery provided with several edges, and the mirror holder has apertures shaped so as to be opposite the holder plate, and guiding members for detachably assembling the bolt shaped supporting means to the front surface of the mirror holder. Further, the bolt shaped supporting means has a cam portion for securing the holder plate to prevent it from comming off from the aperture and a structure for determining its position.

Drawbacks of a conventional mirror holder of this type consists in that the holder plate by merely engaging the aperture formed in the holder does not have a holding force and the holder plate is easily disengaged due to a vibration or an impact during the vehicle traveling which may cause loosening of the engaged portion. Therefore, it is conventionally necessary for the mirror holder to be assembled so that the holder plate is engaged into the aperture formed in the holder and, thereafter the supporting means is mounted to the guiding means in order to hold the holder plate from disengaging therefrom. As described above, it is necessary for the conventional mirror holder that another component is used in order to secure the holder plate to the body of the mirror holder and there has been an inevitable defect that the process of assembling becomes complicated.

It is therefore an object of present invention to provide a two piece type mirror holder for a rearview mirror which has a sufficient holding strength for a mirror plate.

It is another object of present invention to provide a two piece type mirror holder for a rearview mirror which can precisely engage the mirror plate and can be readily associated without another component separated therefrom.

It is still another object of present invention to provide a holding device of a mirror element for a rearview mirror comprising a two piece type mirror holder.

SUMMARY OF THE INVENTION

The holding device of a mirror element for a rearview mirror of the invention includes a supporting member, a mirror holder having a mirror plate, a holder plate, pivot means for tiltably supporting the holder plate relative to the supporting member, means for latching the mirror holder to the holder plate which is formed between the holder plate and the mirror holder facing each other, respectively; at the upper portion of the pivot means, and fixing means for connecting and locking the holder plate to the mirror holder which is formed between the holder plate and the mirror holder facing each other at the lower portion of the pivot means.

The latching means preferably comprises a hook-shaped hook hanger formed at the upper rear portion of the mirror holder, a hole formed at the upper of the holder plate to allow the hook hanger to penetrate thereinto and, a supporting rod provided at the upper portion of the hole to fasten the hook hanger.

The fixing means preferably comprises a pair of sokets formed at the lower portion of the mirror holder, a bearing member disposed between the sockets, and a resilient pair of studs formed at the lower front portion of the holder plate to insert into each of the sockets.

The bearing member is preferably resiliently and fixedly held by the studs on both sides which are engaged into the sockets, respectively.

The bearing means may have a recess opening rearwardly and be provided with an undercut portion to which an end of the studs is fastened to the outer wall along the recess. A filler material such as a plastic or a rubber material filling the inside of the bearing member when it is molded or assembled is available for adjusting bending or modifying degree of the bearing member.

On each contacting surface where each of the studs penetrates into the sockets, it is possible that one is provided with a recess for determining the location for the studs and the sockets and the other is provided with a projection engaging the recess.

The means for adjustably supporting the mirror element can not only include a remote control type actuator unit adjustable to adjust the reflecting angle of the mirror from the compartment of the vehicle it can also comprise a bearing seat merely provided in the mirror housing. The supporting member has a spherical socket supporting the pivot means disposed on the holder plate and is engaged by a connecting member provided with means for adjusting an engaging torque of the pivot means clamped with the spherical socket.

In assembling the rearview mirror, an intermediate assembly or subassembly in which a desired engaging torque is adjusted by adjusting clamping of the connecting member while associating in advance the holder plate with the actuator unit, is provided. Thereafter, the mirror element is approached to the holder plate of the actuator side, and a pair of studs provided at the front lower portion of the holder plate engages a pair of sockets formed under the mirror holder while the hook type hook hanger of the upper portion of the mirror element engages the supporting member of the upper portion of the holder plate. Thereby the bearing member disposed between each of the sockets is resiliently and fixedly held by a pair of studs on both sides. If the mirror plate is damaged or scratched during use, only the mirror element is removed and, a separate new mirror element of the same type is mounted on the holder plate as described above.

In the present invention, a durable holder plate is used for repeatedly mounting on it or removing from it the rear surface of the mirror holder. The holding strength of their engagement is with each other higly precise. It is possible to mount or remove the mirror holder and further the holder plate easily and, further, the clamping force between the studs and the sockets is adjustable since, the pair of studs formed at the lower front surface of the holder plate is inserted into a pair of sockets formed at the lower rear surface of the mirror holder, and the bearing member is resiliently held by the pair of studs on both sides.

BRIEF DESCRIPTION OF THE DRAWINGS

Further objects and advantages of the present invention will be apparent from the following description with reference to the accompanying drawings wherein.

DESCRIPTION OF PREFERRED EMBODIMENTS

Figure 1:
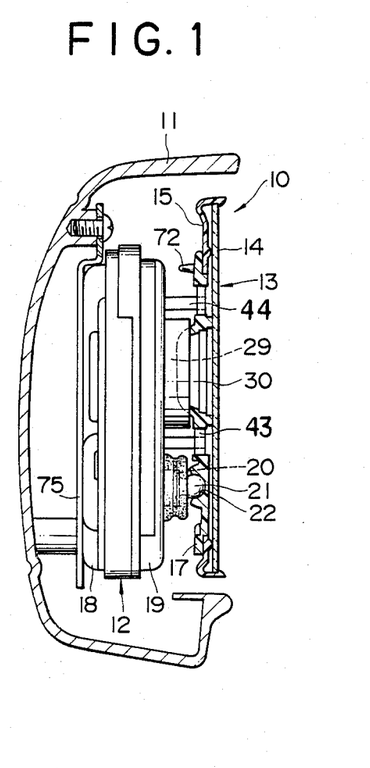
FIG. 1 is a sectional view of a rearview mirror according to a preferred embodiment of the present invention.

Referring now to the drawings, a preferred embodiment of the invention is illustrated therein. FIG. 1 shows an internal structure of a rearview mirror provided with a remote controlled type actuator and FIG. 2 shows a partially enlarged sectional view of some portions of the rearview mirror shown in FIG. 1.

The assembly of a rearview mirror 10 includes a mirror housing 11, an actuator unit 12 fixed to a base plate 75 in the mirror housing 11, and a mirror element 13 mounted in front of the actuator unit 12 and adjustable at a tilting angle with respect to the mirror housing 11. The mirror element 13 comprises a mirror plate 14 and a mirror holder 15 for holding the mirror plate. The mirror holder is adjustable to enable adjustment of the mirror plate relative to the mirror housing 11. A holder plate 17 is tiltably mounted through connecting means at the rear side of the actuator unit 12. An opening 16 is provided at the center of the mirror holder 15 to allow the holder plate 17 to be detachably mounted therein.

Figure 2:
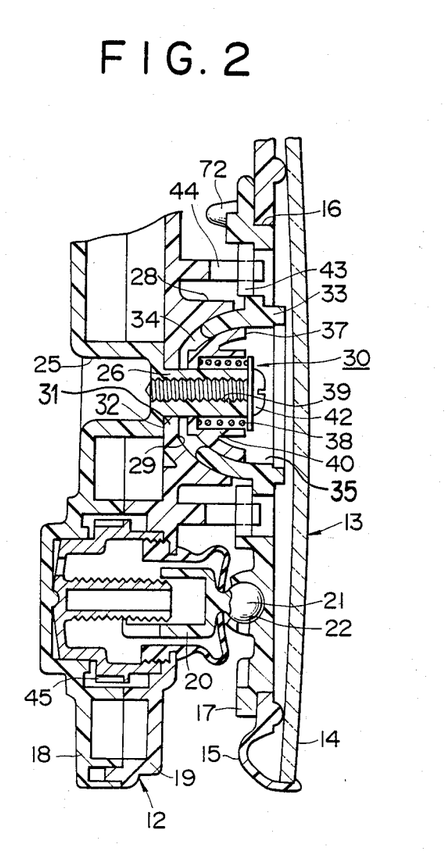
FIG. 2 is an enlarged sectional view of a holding device of a mirror element.

The actuator unit 12 has, as shown in FIG. 2, engaging each other separate front 18 and a rear housings 19, and located therein two sets of electric motors (not shown) each with a worm (not shown) for forming a drive transmission and a worm wheel 45 only one worm being shown in the drawings. Substantially in the center of the rear housing 19, there is provided double socket-type connecting means 30 to be described later to tiltably support the mirror element 13. The worm wheels of the drive transmission are disposed in the housing in positions in which they are spaced from connecting means 30 as a center and at a right angle of the radii. An adjusting nut 20 is attached to each worm wheel 45, and a movable pivot 21 provided at the end of the adjusting nut 20 is engaged with a spherical seat 22 formed on the forward looking surface of the holder plate 17. An intermediate assembly or subassembly 23 shown in FIG. 17 comprises the holder plate 17 and the actuator unit 12 mounted thereon. When any of the electric motors is rotated in opposite directions, the adjusting nut 20 moves back or forth through the drive transmission, and the reflecting angle of the mirror element 13 is adjusted vertically or horizontally.

The connecting means 30 includes, as shown in FIG. 2, a cylinder 26 having an inner threaded bore 39 and projecting beyond the front housing 18, a tapping screw 42 received in the inner threaded bore, and a double ball and socket structure is formed at the periphery of the cylinder. The actuator unit 12 comprises a cylinder 25 having a height extending from the front housing 18 to the inner surface of the rear housing 19. The threaded cylinder 26 is positioned on top of the center of the cylinder 25 and extends through the through-hole 31 of a bearing seat 28 formed in the rear housing 19. The bearing seat 28 has a spherical socket 29 for receiving a pivot 33 projecting from the holder plate 17. The lower surface of the bearing seat 28 is in contact with the shoulder 32 of the cylinder 25, and the cylinder 26 extends upwardly into the through-hole 31 from the center of the opening formed in the spherical socket 29. The tapping screw 42 is screwed into the threaded bore 39 from the rear side.

The mirror holder and the holder plate will be described in detail.

Figure 3:
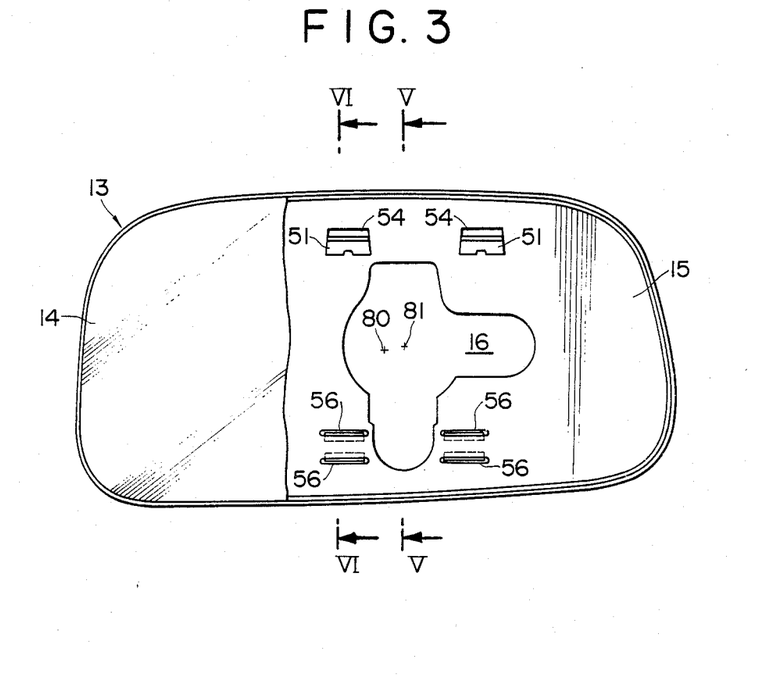
FIG. 3 is a partially cut-away view of the mirror elements showing part of the mirror holder.

FIG. 3 shows the mirror element 13 in which the mirror holder 15 is partially shown by partially cutting away the mirror plate 14. The mirror element 13 includes the mirror plate 14 engaged with or bonded to the front surface of the mirror holder 15 having the opening 16 at the center thereof.

Figure 4:
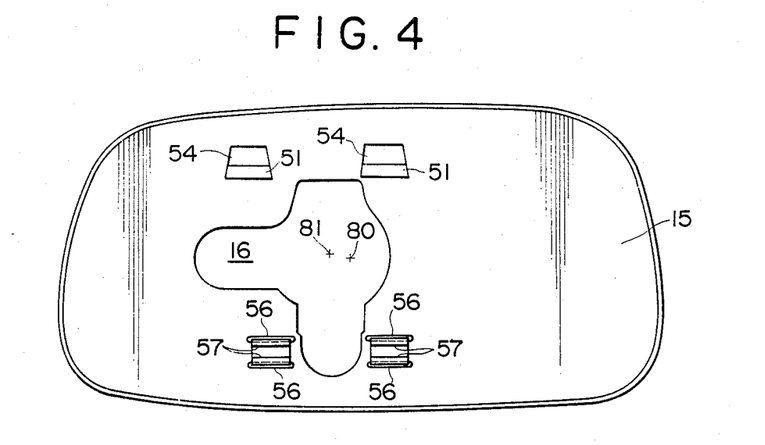
FIG. 4 is a rear side view of the mirror holder.

FIG. 4 shows the rear surface of the mirror holder 15. Numeral 80 designates the center of the mirror, and numeral 81 designates the rotating center of the mirror plate.

Figure 5:
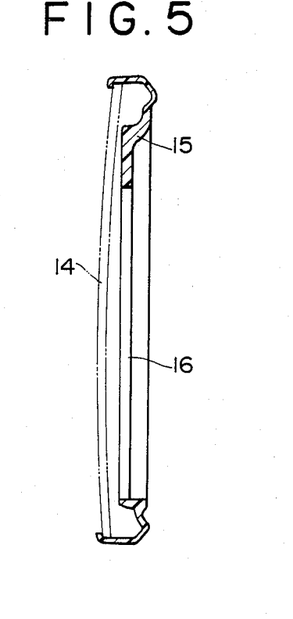
FIGS. 5 and 6 are sectional views along V—V and VI—VI lines of FIG. 3.
Figure 6:
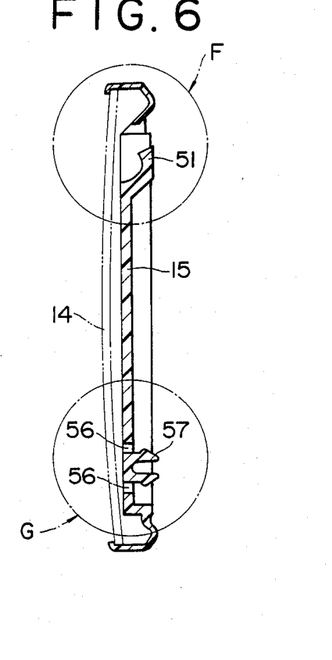

FIG. 5 shows the sectional view along V—V line of FIGS. 3 and 6 shows the sectional view along VI—VI line of FIG. 3.

Figure 9:
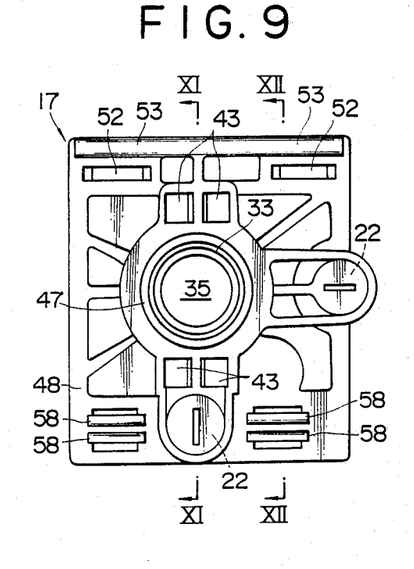
FIG. 9 is a front view of a holder plate.
Figure 10:
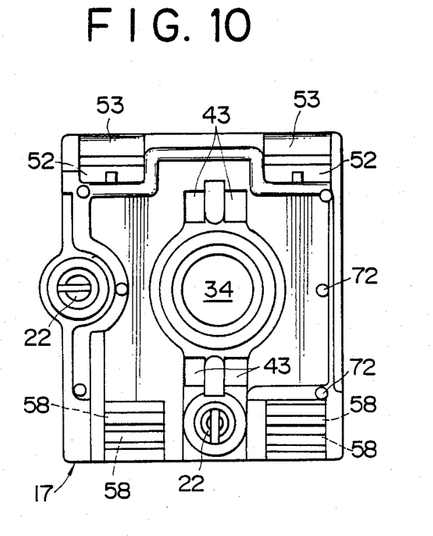
FIG. 10 is a back side view of the holder plate.
Figure 11:
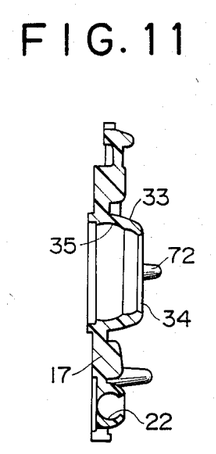
FIGS. 11 and 12 are sectional views along XI—XI and XII—XII lines of FIG. 9.

FIGS. 9 and 10 show the front and rear surface of the holder plate 17. The hollow-spherical segment-shaped pivot 33 is formed at the center of the rear surface of the holder plate 17 and has a through-hole 34 at its top and a recessed spherical surface 35 inside. A spherical segment shaped cap 37 is engages the recess spherical surface 35 of the pivot 33. The cap 37 includes a hollow portion 40 for receiving both a helical spring 38 and the cylinder 26. The tapping screw is inserted into the bore 39 of the cylinder 26 at the bottom of the hollow portion 40. The pivot 33 is fixed to the cylinder 26 by the cap 37 which is turn is fixed to the cylinder 26 by the helical spring 38 which extends between the washer secured to the cylinder 26 by tapping screw 42 and a top portion of the cap 37.

Figure 17:
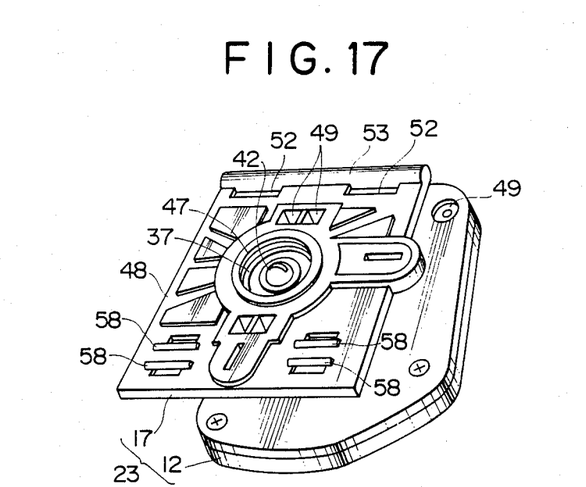
FIG. 17 is a perspective view showing an actuator unit and the holder plate during assembly.

As shown in FIG. 17, the subassembly 23 includes the holder plate 17 tiltably mounted to the actuator unit 12 by the connecting means 30.

In order to mount the mirror element 13 on the holder plate 17 of the subassembly 23, latching means 50 and a fixing means 55 (FIGS. 18 and 19A) are formed between the mirror holder 15 and the holder plate 17, which and are, respectively, symmetrically disposed over and under the rotating center 81 of the mirror element. A center portion 47 (FIG. 9) of the front central portion of the holder plate 17 engages the opening 16 formed at the central portion of the mirror holder by utilizing the latching means 50 and the fixing means 55. A peripheral edge 48 is arranged in a close contact with the rear surface of the mirror holder 15 to complete the assembling.

Figure 7:
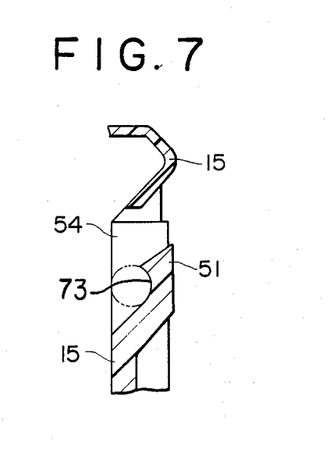
FIGS. 7 and 8 are partially enlarged views of F and G portions of FIG. 6.
Figure 12:
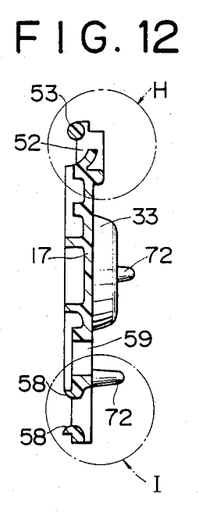
Figure 13:
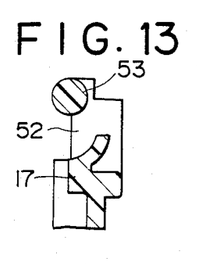
FIGS. 13 and 14 are partially enlarged views of H and I portions of FIG. 12.
Figure 14:
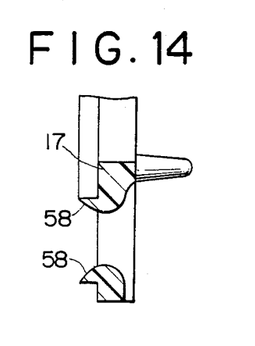

The latching means 50 comprises, as shown in FIG. 7, a hook shaped hook hanger 51 provided at an upper clipped portion 54 on the rear surface of the mirror holder 15, as shown in FIG. 7 an inserting hole 52 formed in the upper portion of the holder plate 17 as shown in FIGS. 12 and 13 through the hook hanger penetrates and a supporting rod portion 53 located at the upper portion of the inserting hole 52 for fastening the hook hanger 51. As shown in FIGS. 3 and 4, the latching means 50 is symmetrically located to the left and to the right of the perpendicular line passing through the rotating center 81 of the mirror element.

The fixing means 55 comprises a pair of narrow sockets 56 provided at the lower portion of the mirror holder 15 adjacent to each other, a bendable bearing member 57 disposed between each pair of sockets and a pair of studs 58, 58 formed at the front surface of the holder plate 17 with respect to each pair of sockets. The interval between studs 58, of each pair is so selected that the sockets closely engage the outer surface of the bearing member 57. The sockets 56, and the studs 58, of each respective pair are shown as located in a vertical plane, it is also possible to locate them horizontally in altering the position thereof at the right angle.

Figure 8:
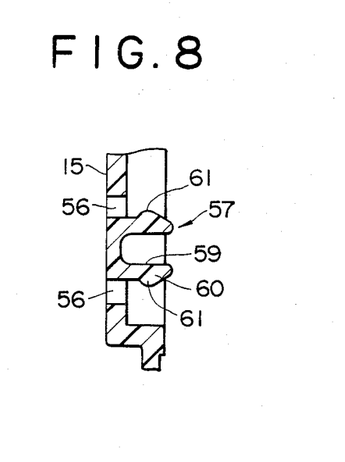

As shown in FIGS. 6 and 8, the bearing member 57 which is made of a plastic materials, is integrally formed with the mirror holder 15. The bearing member 57 has a recess 59 opening rearwardly and side portions 60 each having an undercut portion 61 to be engaged with the studs 58 at the outside of the wall portion along the recess.

A member M made of plastic or rubber materials or the like for adjusting the degree of bending and modifying the bearing member is received in the recess 59 of the bearing member 57 in order to adjust the modifying degree of the side portions 60 of the bearing member.

Figure 15:
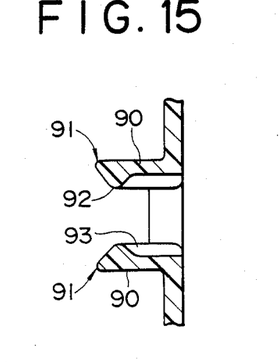
FIG. 15 is a enlarged sectional view showing a modified embodiment of a stud.
Figure 16:
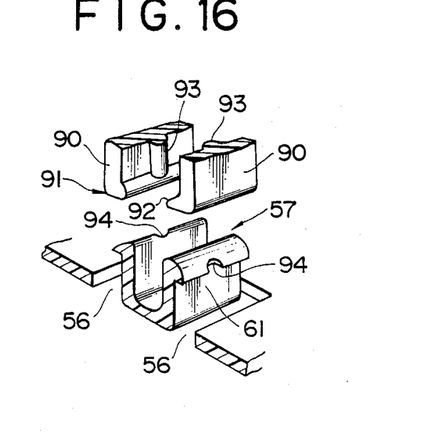
FIG. 16 is an exploded perspective view of the studs separated from a bearing member.

FIG. 15 shows a modified embodiment of the studs and FIG. 16 shows an exploded perpendicular view of the bearing member engaging with such studs. As shown in each of the modified embodiments, a pair of resilient legs 90, 90 horizontally projects from the holder plate 17 in a position opposite to a pair of sockets, and each of studs 91, 91 is integrally formed with the legs. A pawl 92 connected with the undercut portion 61 of the bearing member 57 is provided at the engaging portion with the sockets 56 and studs 91, penetrating thereinto. A protruded portion 93 for determining the location of the studs is formed at the central portion of each stud parallel to a respective leg and a respective, the recess 94 engaging with the protruded portion is formed at the bearing member side. Edges of the engaging portions with each of sockets and studs penetrating thereinto are substantially rounded to withstand repeated assembly and detaching.

As described above, the central portion 47 having the pivot 33 is formed at the center of the holder plate 17. As shown in FIGS. 9 and 10, a pair of retainers 43,43 is vertically formed at said central portion 47. The retainers are provided for engaging with a yoke-like anti-rotation piece 44 protruded from the rear housing 19 as shown in FIG. 2. The spherical bearing seats 22, each 22 with a slit engaging a movable pivot 21 at the top of the adjusting nut 20 of the actuator side are formed at the back side of the pivot plate at positions defining radii intersecting at a right angle with the pivot 33 as a center.

Numeral 72 designates a stopper for restricting an angle of a contact of the mirror with the rear housing 19 upon adjusting an inclination angle of the mirror at a plurality of different positions with respect to the housing.

The operation of the holding device of this embodiment will be below.

The mirror assembly 10 shown in FIG. 1 is assembled as follows. The hollow spherical segment-shaped pivot 33 of the holder plate 17 is first engaged with the spherical socket 29 formed in the rear housing 19 of the actuator unit 12, and the movable pivots at the top of the actuator side adjusting nuts 20 are simultaneously engaged with the spherical seats 22. Then, the spherical segment-shaped cap 37 is engaged within the recess spherical surface 35 of the pivot 33, and clamped with the threaded cylinder 26 by the helical spring 38 and the tapping screw 42 with the washer as shown in FIG. 17. The holder plate 17 is held by a suitable torque due to the elastic force of the spring 38 and the clamping force of the screw 42.

Figure 18:
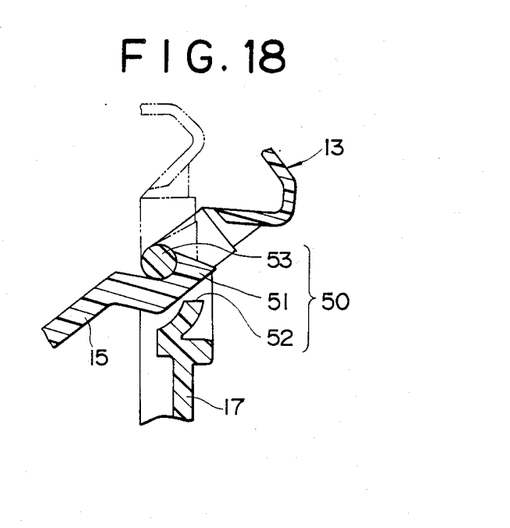
FIG. 18 is a sectional view showing the mirror holder in a position in which it is ready for engaging the holder plate.
Figure 19A:
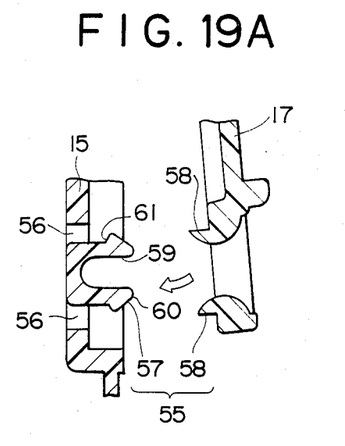
FIG. 19A is a sectional view of the stud in a position in which it is ready for inserting into the socket.
Figure 19B:
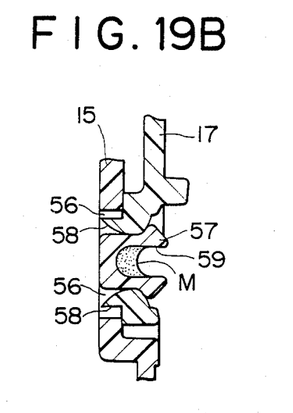
FIG. 19B is a sectional view showing engagement of the stud with the socket.

The subassembly 23 in which the holder plate 17 is mounted in the actuator unit 12 as described above is fixed to the base plate 75 in the mirror housing 11. When fixing, screws (not shown) are inserted into the screw holes 49 in the actuator unit 12 and clamped. Thereafter, as shown in FIG. 18, the mirror element 13 is inclined and approached to the holder plate 17. Subsequently, the right and left hook-shaped hook hangers 51 of the mirror element side are inserted into the holes 52 of the upper portion of the holder plate 17 to be engaged with the respective supporting rod portions 53, and thereafter the mirror element 13 is rotated anticlockwise in FIG. 18 around the supporting rod portions 53 as a center. While in the lower portion of the mirror element 13, the bearing member 57 is resiliently held by a pair of studs 58 as shown in FIG. 10 on both sides by inserting the pair of studs 58 into the pair of sockets 56 as shown in FIG. 19A. As a result, the central portion 47 of the holder plate side is engaged with the opening 16 of the mirror holder side, and the peripheral edge 48 is simultaneously closely contacted with the flat surface around the opening 16.

The hook hanger 51 has a circular-arc-shaped inner surface 73 to be contacted at with approximately one third of the circumference of the supporting rod 53 as shown in an enlarged view in FIG. 18. It is latched while rotating the mirror element 13 with the supporting rod 53 as a center. Even if the studs 58 at the lower portion are removed during rotation or upon finishing the rotation, its hook portion are not easily removed. When the studs 58 and the sockets 56 are engaged with each other, the upper periphery or side portions 60 of the bearing member are easily bended, resulting in the studs 58 being also easily removed therefrom. The member M made of plastic or rubber materials or the like for adjusting the degree of bending is received in the recess 59 of the bearing member in order to adjust the degree of bending thereof, and it is possible that both the holder plate and the mirror holder are firmly mounted with each other.

In the embodiments shown in the drawings, the holder plate is mounted on the front surface of the a remotely controlled actuator unit, but it is also possible that the holder plate is directly mounted to the fixed base plate 75 mounted in the mirror housing.

Further, the terms "upper" and "lower" portion or position of the latching and fixing means are intended to be understood in a generalized meaning, i.e. on opposite sides of the opening 16 or connecting means 30. Though actually higher and lower positions, respectively, are preferred, also an upside-down arrangement or a left side—right side arrangement or anything inbetween is claimed to be covered by the chosen terms.

While the invention has been illustrated and described as embodied in a device for holding a mirror element for rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for holding a mirror element comprising a mirror plate of a rearview mirror for a motor vehicle, said holding device comprising:
   a mirror holder for supporting the mirror plate;
   a holder plate for supporting said mirror holder;
   means for tiltably supporting said holder plate, said supporting means including a supporting member and pivot means provided on a surface of said holder plate and having upper and lower portions for tiltably supporting said holder plate on said supporting member;
   means located between said mirror holder and said holder plate at the upper portion of said pivot means for latching said mirror holder to said holder plate; and
   means located between opposite surfaces of said mirror holder and said holder plate at the lower portion of said pivot means for fixing said mirror holder to said holder plate, said fixing means comprising a pair of studs projecting from one of said opposite surfaces and a pair of sockets located opposite said pair of studs on the other of said opposite surfaces for resiliently receiving said pair of studs.

2. A device according to claim 1 wherein said pair of studs is integrally formed with said one of said opposite surfaces.

3. A device according to claim 1 wherein said mirror holder has an upper rear portion and said holder plate has an upper portion, said latching means including a hook-shaped hook hanger located at said upper rear portion of said mirror holder, a hole having an upper portion and formed in said upper portion of said holder plate for receiving said hook hanger, and a supporting rod located at said upper portion of said hole for securing said hook hanger therein.

4. A device according to claim 1 wherein said mirror holder has a center of rotation, said latching means and said fixing means being symmetrically disposed on opposite sides of the center of rotation.

5. A device according to claim 1 wherein said mirror holder has a central opening and said holder plate has a central portion received in said central opening of said mirror holder.

6. A device according to claim 1 wherein said studs and said sockets have contacting surfaces, respectively, one of said contacting surfaces having a projection thereon and the other of said contacting surfaces having a recess for receiving said projection to thereby determine location of a respective stud in a respective socket.

7. A device according to claim 1 wherein said supporting member has a spherical socket for receiving said pivot means, said device further comprising means for connecting said pivot means with said spherical socket, said connecting means including means for adjusting a torque applied to connect said pivot means with said spherical socket.

8. A device according to claim 1 wherein said supporting member is formed as a remote control actuator for adjusting a reflecting angle of the mirror plate.

9. A device according to claim 1 wherein said mirror holder has a lower portion and said holder plate has a lower front portion, said sockets being located in said lower portion of said mirror holder and said studs being located at said lower front portion of said holder plate, said fixing means further comprising bearing means located between said sockets and having opposite sides, said studs resiliently engaging said opposite sides of said bearing means, respectively, upon being received in said sockets, respectively.

10. A device according to claim 9 wherein said bearing means has an undercut portion, and each of said stud has an end fastened to said undercut portion and a pawl at said end for engaging said undercut portion of said bearing means.

11. A device according to claim 9 wherein said bearing means has a rearward recess and said fixing means further includes filler means received in said rearward recess for adjusting bending of said bearing means.

* * * * *